United States Patent [19]
Borger

[11] Patent Number: 4,572,961
[45] Date of Patent: Feb. 25, 1986

[54] CONSTANT SPEED DRIVE WITH COMPENSATION USING DIFFERENTIAL GEARS

[75] Inventor: William U. Borger, Dayton, Ohio

[73] Assignee: The United States of America as represented by the Secretary of the Air Force, Washington, D.C.

[21] Appl. No.: 601,514

[22] Filed: Apr. 18, 1984

[51] Int. Cl.$^4$ .................. H02K 7/02; H02P 15/00
[52] U.S. Cl. .................. 290/4 R; 290/4 A; 290/4 B; 290/1 R; 322/40
[58] Field of Search .................. 290/4, 1; 322/35, 38, 322/40

[56] References Cited

U.S. PATENT DOCUMENTS

| | | | |
|---|---|---|---|
| 532,861 | 1/1895 | Bell | 322/40 X |
| 2,256,463 | 9/1941 | Alexanderson | 290/4 R |
| 2,297,812 | 10/1942 | Stoltz | 322/40 X |
| 2,567,202 | 9/1951 | Goertz | 322/40 X |
| 2,597,357 | 5/1952 | McCormick | 322/40 X |
| 2,796,565 | 6/1957 | Walcott, Jr. | 318/8 |
| 2,801,380 | 7/1957 | Wellington, Jr. | 322/27 |
| 2,883,611 | 4/1959 | Fuge | 322/40 |
| 3,315,085 | 4/1967 | Mileti et al. | 290/4 R |
| 3,538,413 | 11/1970 | Baylis et al. | 318/685 |
| 3,559,008 | 1/1971 | Stut et al. | 318/8 |
| 4,289,996 | 9/1981 | Barnes et al. | 318/38 |
| 4,439,720 | 3/1984 | Georges | 322/40 X |
| 4,476,395 | 10/1984 | Cronin | 290/4 C X |
| 4,488,053 | 12/1984 | Cronin | 290/4 C |
| 4,513,206 | 4/1985 | Geruasio et al. | 290/4 C |

OTHER PUBLICATIONS

J. J. Cathey, "Electrically Compensated Aircraft Alternator Drive", Proceedings of the IEEE National Aerospace and Electronics Conference, May 17-19, 1983, pp. 116-122.

Primary Examiner—William M. Shoop, Jr.
Assistant Examiner—Shik Luen Paul Ip
Attorney, Agent, or Firm—Donald J. Singer; Bernard E. Franz

[57] ABSTRACT

The electrical supply system on aircraft may employ a constant speed drive (CSD) to convert variable engine speed to constant speed for operation of synchronous 400 Hz electrical generators. The heart of these devices is a differential which mechanically sums the input of two shafts and outputs this sum to a third shaft. Connected to this third shaft is a constant speed synchronous generator. Connected to one of the input shafts is the turbine generator (most likely through gearing). The second input shaft is connected to a speed compensating drive which accounts for engine speed changes. The speed compensating device disclosed herein is an electrically compensating motor/generator arrangement. Bidirectional power flow in the electric compensation link uses two high-speed, permanent-magnet, three-phase machines interconnected by a power conditioning network. One machine is operated as a brushless dc machine, while the other functions as a variable speed synchronous machine. Steady-state performance of two types of power conditioning are presented—a dc link inverter and a cycloconverter link.

3 Claims, 12 Drawing Figures

CONSTANT SPEED DRIVE WITH COMPENSATION USING DIFFERENTIAL GEARS

RIGHTS OF THE GOVERNMENT

The invention described herein may be manufactured and used by or for the Government of the United States for all governmental purposes without the payment of any royalty.

BACKGROUND OF THE INVENTION

This invention relates to a constant speed drive device to convert variable engine speed to constant speed for operation of synchronous electrical generators, using differential gears, particularly for use on aircraft.

The need for a highly efficient link, capable of bilateral power flow, connecting a variable speed shaft to a constant speed shaft is manyfold. A particular need is to drive an onboard aircraft alternator at constant speed while the turbine engine speed varies. Presently, two methods are employed to provide a constant frequency on aircraft:
1. Constant Speed Drive (CSD)
2. Variable-Speed, Constant Frequency (VSCF)

The VSCF system allows the alternator shaft to vary directly with turbine speed. The variable frequency alternator output is then conditioned by a cycloconverter to obtain a constant frequency. The VSCF system is not sensitive to attitude changes, and thus, functions well on highly maneuverable aircraft. However, total output power of the alternator must pass through the cycloconverter, leading to bulky and expensive power conditioning and filter circuitry.

The CSD scheme utilizes a mechanical differential which mechanically sums the input of two shafts and outputs this sum to a third shaft. Connected on this third shaft is a constant speed synchronous generator. Connected to one of the input shafts is the turbine (nost likely through gearing). The second input shaft is connected to a speed compensating device which accounts for engine speed changes. The speed conpensating device has been a hydraulic motor supplied by a hydraulic pumping mechanism driven from the engine. A constant alternator shaft speed is maintained by proper clockwise or counterclockwise rotation of the differential carrier housing through use of a reversible hydraulic pump-motor drive. For a 1.7:1 turbine speed range and a lossless system, a maximum of 21.5% of the alternator shaft power must pass through the compensating hydraulic drive, while 78.5% to 100% of the power is transmitted directly through the differential gearing. The hydraulic CSD's are extremely sensitive to attitude and require special oil systems and filling procedures to ensure proper operation during all flight modes. Without the special oil systems, there is a problem during maneuvers that produce negative gravity. In such cases, fluid level shifts can cause the hydraulic system to momentarily malfunction, creating an out-of-frequency range condition and leading to loss of electrical power.

Regardless of the above described potential failure mode, the concept of the CSD system has a quite desirable feature in that a large percentage of its output power is transmitted only through a low-order-mesh gear train, which by nature is highly efficient.

The following items relating to electrical machinery are referenced in the detailed description:

1. E. Ohno, T. Kishimoto, and M. Akamatsu, "The Thyristor Commutatorless Motor," *IEEE Trans. Mag.,* Vol. MAG-3, September 1967, pp. 236–240.
2. T. Tsachiya, "Basic Characteristics of Cycloconverter-Type Commutatorless Motors," *IEEE Trans. IGA,* Vol. IGA-7, No. 4, July–August 1970, pp. 349–356.
3. N. Sato and V. V. Semenos, "Adjustable Speed Drive with a Brushless DC Motor," *IEEE Trans. IGA,* Vol. IGA-7, No. 4, July–August 1971, pp. 539–543.
4. E. P. Cornell and D. W. Novotny, "Commutation by Armature Induced Voltage in Self-Controlled Synchronous Machines," *IEEE Trans. PAS,* Vol. PAS-93, 1974, pp. 760–766.
5. N. Sato, "A Brushless DC Motor with Armature Induced Voltage Commutation," *IEEE Trans. PAS,* Vol. PAS-91, July–August 1972, pp. 1485–1492.
6. J. M. D. Murphy, *Thyristor Control of AC Motors,* (Pergamon Press, Oxford, 1973), pp. 140–149.
7. F. J. Bourbeau, "Synchronous Motor Railcar Propulsion," *IEEE Trans. IAS,* Vol. IA-13 No. 1, January–February 1977, pp. 8–17.
8. T. Maeno and M. Kobata, "AC Commutatorless and Brushless Motor," *IEEE Trans. PAS,* Vol. PAS-91, July–August 1972, pp. 1476–1484.
9. Y. Shrinryo, I. Hosono, and K. Syoji, "Commutatorless DC Drive for Steel Rolling Mill," *IEEE-IGA Conference Record,* 1977 Annual Meeting, pp. 263–271.
10. A. C. Williamson, N. A. H. Issa, and A. R. A. M. Makky, "Variable-Speed Inverter-Fed Synchronous Motor Employing Natural Commutation," *Proc. IEEE,* Vol. 125, No. 2, Feb. 1978, pp. 118–120.
11. N. A. Demardash, T. W. Nehl, and E. Maslowski, "Dynamic Modeling of Brushless DC Motors in Electric Propulsion and Electromechanical Actuation by Digital Techniques," *IEEE IAS Conference Record,* 1980 Annual Meeting, September 28–October 3 1980, pp. 570–579.

SUMMARY OF THE INVENTION

An object of the invention is to provide a link connecting a variable speed shaft to a constant speed shaft, having improved efficiency, that is insensitive to aircraft attitude changes, while retaining the desirable features of a Constant Speed Drive (CSD). Another object is to substantially reduce the cost of such a link.

According to the invention, the hydraulic compensation drive is replaced with an electric compensation drive in a Constant Speed Drive (CSD) device.

An advantage is that a properly designed electric drive offers an increase in overall efficiency, due to reduction in losses through the speed compensation path. Also, the potential exists for a greater interval between maintenance than for the compensating hydraulic drive system.

BRIEF DESCRIPTION OF THE DRAWING

FIGS. 1A and 1C are views of the gears taken respectively along lines 1B—1B and 1C—1C of FIG. 1A;

DETAILED DESCRIPTION

I. Introduction

Figure 1A:
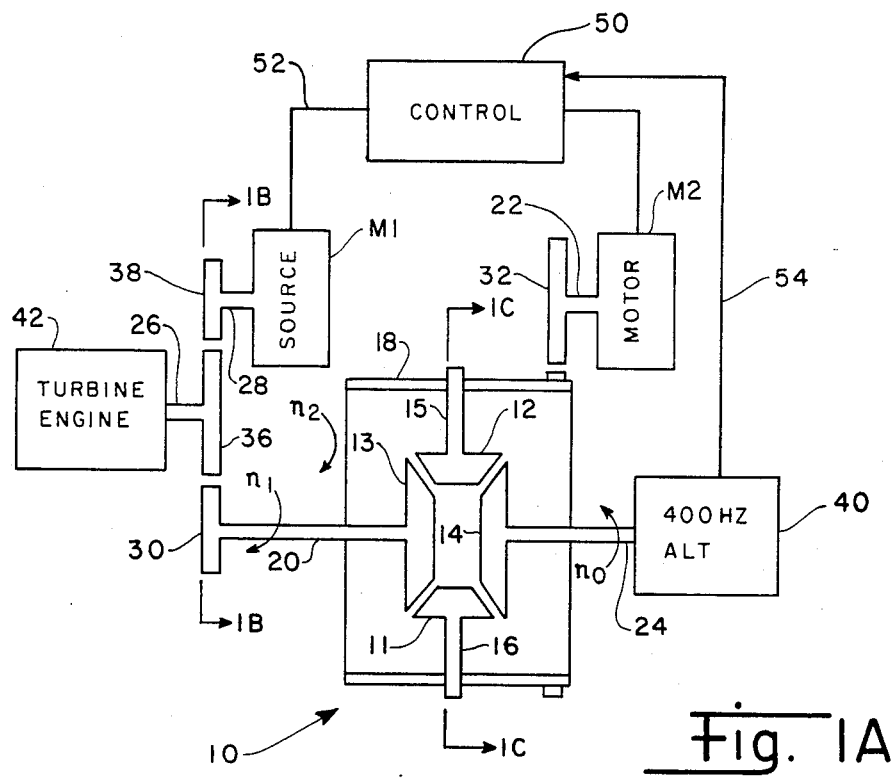
FIG. 1A is a symbolic diagram showing the physical arrangement of an electrically compensated constant drive (ECCSD) device.

The diagram of FIG. 1A applies to both the prior art hydraulic constant speed drives, and to the electrically compensated constant speed drives according to the invention. The heart of these devices is a differential 10 which mechanically sums the input of two shafts 20 and 22 and outputs this sum to a third shaft 24. Connected to this shaft 24 is a constant speed synchronous 400 Hz generator 40. Coupled to one of the input shafts 20 is the turbine engine 42 (most likely through gearing, represented in the drawing as spur gears 30 and 36). The second input shaft 22 is connected to a speed compensating drive device M2 which accounts for engine speed changes. To date, the speed compensating device M2 has been a hydraulic motor supplied by a pumping mechanism driven from the engine. In the hydraulic system, the source M1 is an hydraulic pump, shown coupled via a spur gear 38 and gear 26 to the engine. The control unit 50 and line 52 are part of the hydraulic pumping mechanism. Additional components are also required to ensure satisfactory operation during all aircraft flight regimes. These include: charge pump, scanvenge pumps, all attitude reservoir, relief valves, and filters. The invention described herein removes the attitude-sensitive hydraulic motor/pump and replaces them with an electrically compensating motor/generator arrangement.

The input shaft 20 is geared to produce the primary input speed to the differential, $n_1$. The speed of the second input shaft 22 is $n_2$. The speed of the output shaft 24 is $n_0$ For the type of differential depicted, the relation between the differential shaft speeds is given by $n_2 = r(n_1 - n_0)$, where r is a constant depending on differential design.

Figure 1B:
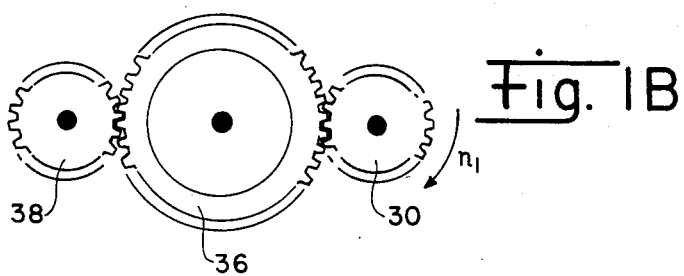
Figure 1C:
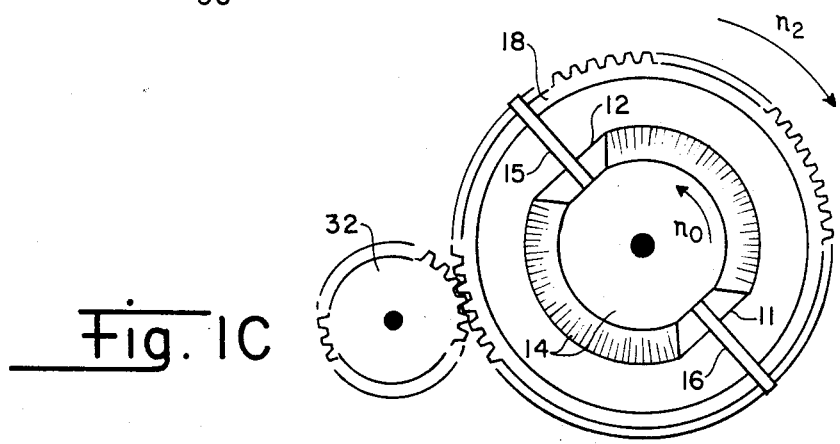

The views of FIGS. 1B and 1C are provided to give a clearer picture of the gearing for those readers not intimately acquainted with this type of machinery. Note in FIGS. 1A–1C, that all support and bearing structure for the gears is omitted. The view in FIG. 1A can be considered as being through the centers of all of the gears and shafts, but cross hatching is omitted for clarity. The spur gears 38, 36 and 30 are shown in FIG. 1B, with a view along lines 1B—1B of FIG. 1A. For clarity, the apparatus behind these three gears is omitted in FIG. 1B.

The differential 10 is shown in FIG. 1C, with a view along lines 1C—1C of FIG. 1A. Note that the differential is the same in principle as that used in automobiles between the drive shaft and the rear wheels (shaft 22 coupled to the drive shaft, and shafts 20 and 24 enclosed in the rear axle). The entire differential assembly 10 is contained in an oil-filled enclosure (not shown). There are four bevel gears 11–14 in a ring formation, enclosed in a differential carrier or cage 18 which is also an outer gear. Note that the bevel gear 13 connected to the input shaft 20 does not appear in the view of FIG. 1C. However as seen in FIG. 1A, it drives the bevel gears 11 and 12, which in turn together drive the bevel gear 14 which is coupled to the output shaft 24. The bevel gears 11 and 12 have shafts 15 and 16 respectively which are mounted on bearings of the cage 18; and these shafts rotate freely with no torque except for that produced by frictional losses. Note that cage 18 as shown in FIG. 1C is rotated to a different position from that shown in FIG. 1A. If the cage 18 is not turning, then shafts 20 and 24 rotate in opposite directions at the same speed ($n_0 = n_1$, $n_2 = 0$). When the cage 18 rotates, it carries with it the shafts 15 and 16, and therefore the entire bevel gear ring 11–14. It is possible for shafts 20 and 24 to rotate in the same direction at the same speed as the cage 18 rotates ($n_1 = n_2 = -n_0$) (the normal situation of an automobile traveling in a straight line). The coupling between the shaft 22 and the cage 18 is represented here as a spur gear 32 meshing with spurs around one edge of cage 18.

In the electric constant drive, the major components are the same as in the hydraulic system with the exception of the compensating network where the hydraulic pump M1, motor M2, and control 50 are replaced by electrical components. Both the alternator M1 and the motor M2 are preferably brushless permanent magnet machines. This type of machine will yield an electrically compensated CSD with the least weight while at the same time yielding the greatest reliability and effeciency. The compensating alternator M1, motor M2 and control 50 can be either oil or air cooled. The gear surfaces as well as the bearings should be oil cooled/lubricated to ensure long life. Additional components such as scavenge pumps and filters will be required to ensure oil system integrity. The following advantages of the electrical compensation are noted over hydraulic compensation.

1. Attitude insensitivity. The hydraulic CSDs are extremely sensitive to attitude and require special oil systems and filling procedures to ensure proper operation during all flight modes. The electrical CSDs are essentially impervious to attitude and can operate at extended periods of time (1 to 2 minutes) with no oil. The limitation is cooling.

2. Efficiency—15% increase minimum, 30% maximum.

3. Cost—20 to 30% savings over hydraulic CSDs.

4. Reliability—Hydraulic CSDs are presently yielding around 2000 hours between failures. The electrical CSDs are expected to yield 10,000 hours between failure.

II. Objectives

Electrically-compensated, constant-speed drives (ECCSD) that have potential for application as drive links between a turbine engine and an aircraft alternator have been researched. Objectives were established to study the nature of ECCSD systems in the steady-state. The specific objectives that were pursued are enumerated below:

1. Define candidate electrical machinery and power conditioning circuitry arrangements suitable for use with an ECCSD system.

2. Determine nature of torques, currents, and voltages for each candidate system operating as an ECCSD.

3. Identify special requirements on machines, controls, and power electronic devices that result from the ECCSD application.

III. Basic Requirements and Characteristics of ECCSD

An understanding of the power flow and torque requirements of the ECCSD concept underlies any study as these characteristics must serve as a basis for selection of candidate electric machine and power conditioning systems.

A. Nature of Power Flow.

A physical arrangement of the ECCSD power level components is shown in FIG. 1A, where variable input speed $n_1$, constant output speed $n_0$, and differential carrier speed $n_2$ are related by:

$$n_2 = \tfrac{1}{2}(n_1 - n_0) \tag{1}$$

Speed compensation to maintain $n_0$ constant can be accomplished by two basically different control approaches:

1. Reversing differential operation. Ratios are selected so that $n_0$ lies between the extremes of $n_1$. Thus, from equation (1) it is apparent that $n_2$ can range from negative to positive values or that the differential carrier 18 must be reversed to maintain a constant $n_0$ over the range of $n_1$ excursion.

2. Unidirectional differential operation. Ratios can be selected so that $n_1$ is always greater than (or always less than) $n_0$, leading to the conclusion from equation (1) that $n_2$ does not change sign as $n_1$ varies; or, the differential carrier 18 is always rotated in the same direction for speed compensation.

For study of basic characteristics, a typical turbine speed range of 1.7:1 (10,588 to 1800 rpm) was used. The 400 Hz alternator 40 was modelled as a 44.444 KW load at a constant 12,000 rpm (40 kVA output at unity power factor operating at 90% efficiency). Constant efficiencies were assumed as follows:

1. Electric machines—90%
2. Power conditioning units—95%
3. Gear mesh—99%

Figure 1D:
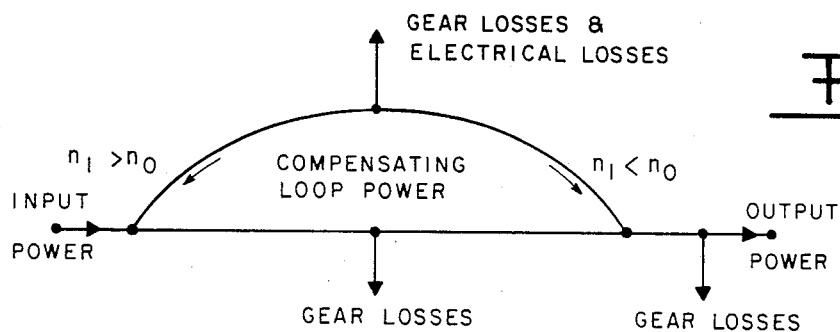
FIG. 1D is power flow diagram of an ECCSD.

Energy balance equations were written for the arrangement of FIG. 1A and turbine speed was incremented across its speed range to examine both the case of reversing differential carrier 18 and the case of unidirectional differential carrier operations. A power flow diagram of the ECCSD system is shown by FIG. 1D where the flow direction of compensating loop power ($P_c$) depends upon the polarity of ($n_1 - n_0$) as indicated on the diagram.

Figure 2:
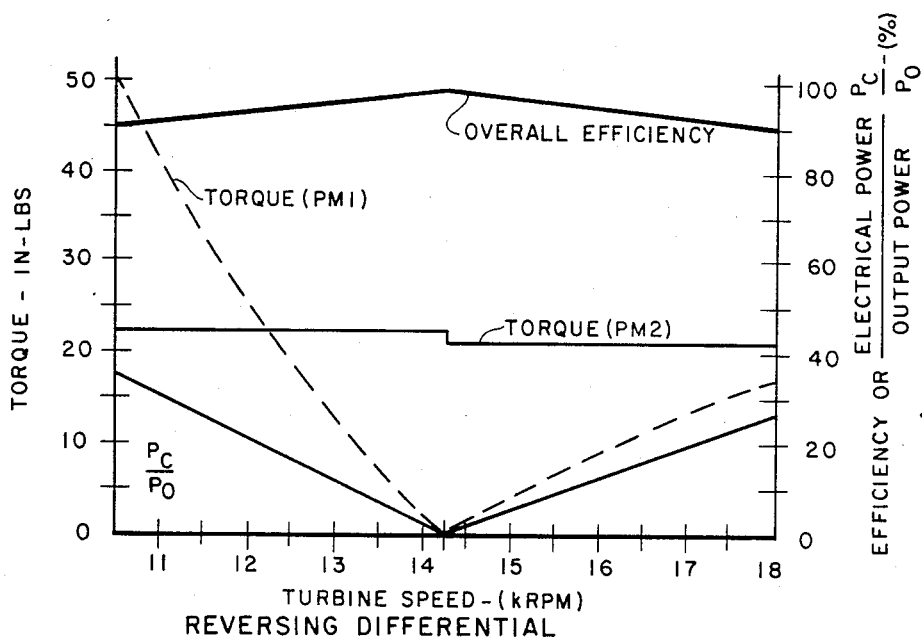
FIGS. 2 and 3 are graphs showing calculated performance respectively of a reversing differential and a unidirectional differential.

The reversing differential carrier 18 results in minimum torque requirements for motor M2 if the midrange speed of $n_1$ is set to equal $n_0$, which also gives a symmetric range on $n_2$ about the zero speed point. FIG. 2 displays the performance results of this system. It is observed that the torque requirements of motor M2 are nearly constant across the range of operation. However, the torque requirements of alternator M1 range from zero at the mid-range speed point to a maximum value at the point of minimum turbine speed. It is further noted that the maximum torque requirement of alternator M1 is greater than that of motor M2. The two maximum torque requirements could be made equal by an unsymmetric shift of the differential carrier 18 zero speed point with a net result of increasing the torque requirement of motor M2 while decreasing the requirement of alternator M1. The ratio of power flowing into the speed compensation loop to power delivered to the 400 Hz alternator 40 ($P_c/P_o$) is plotted to use as an indication of power apportionment between that transmitted by the compensation loop and that transmitted in mechanical form through the ECCSD.

Figure 3:
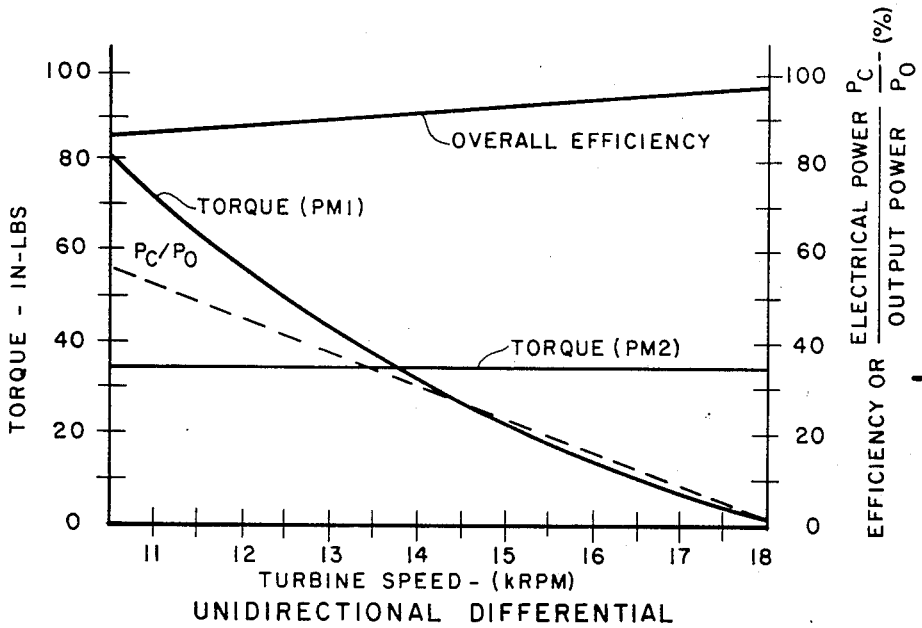

Calculated torque requirements and performance results for unidirectional differential operation, if $n_1$ is less than $n_0$, are depicted by FIG. 3. System gear ratios were selected so that $n_2$ ranges from 2% to 100% of the motor M2 base speed circumventing the necessity of dealing with low frequency torque pulsations at near zero speed.

B. Electric Machines.

The wide speed range, constant torque requirements suggested for motor M2 by the above work is the characteristic of a shunt dc machine; but, due to the brush-commutator maintenance requirement and poor adaptability to liquid cooling, the commutator dc machine is not suitable for aircraft application. However, the brushless dc motor offers the same desired speed-torque characteristics as the dc machine without the disadvantages of the commutator dc machine (references 1–10). Further, use of a machine with a permanent magnet rotor offers two additional advantages:

1. Field excitation is eliminated which removes the complexity of supplying power to a rotating member. Also, machine efficiency is increased due to absence of field excitation losses.

2. Higher speed design is possible for permanent magnet rotors than is feasible with wound rotors permitting increased gear ratios and substantial reduction in electric machine size.

Some of the brushless dc motor performance reported in the literature is experimental data (references 1, 3, 5). Others have presented calculations based on formulas derived using approximations of sinusoidal waveforms or neglecting commutation intervals giving results with some degree of correlation to test data but with appreciable error (references 2, 3, 9). However, the non-linearities introduced by the circuit switching leads to equations that are best solved by numerical techniques, and the reported performance data calculated by numerical solution of network differential equations show the least error between theoretical prediction and test results (references 4, 10, 11). When analyzing PM machines with rare earth magnets and stainless steel retaining rings for rotor constuction, Demerdash has reported (reference 11) that rotor eddy current effects, armature raction, and position dependence of inductances can be neglected leading to a simple third-order system of equations to describe a balanced, three phase, wye-connected PM machine:

$$v = [R]i + [L]pi + e \tag{2}$$

where v is a vector of terminal phase voltages ($v_1$, $v_2$, $v_3$),
i is a vector of phase current ($i_1$, $i_2$, $i_3$),
e is a vector of phase generated voltages ($e_1$, $e_2$, $e_3$),
[R] is a diagonal matrix with each entry being phase resistance,
[L] is a diagonal matrix with each entry being half of line-to-line inductance, and
p ( ) is understood to mean d/dt ( ).

Since the equations given by (2) are decoupled, each can be used in networks formed by addition of the power conditioning circuitry with minimum difficulty.

C. Power Electronics.

Obviously, the power conditioning circuitry of this application must be capable of bidirectional power flow when utilized in conjunction with the electric machinery. No reporting in the literature is available of an ac PM machine-to-brushless dc PM machine drive system. However, two basically different power conditioning links are candidates for use with this ECCSD under study:

1. A dc link inverter using a phase-controlled converter for rectification and synchronous inversion.
2. A cycloconverter link to perform ac-to-ac conversion.

Either of these power conditioning links can use thyristor or transistors as switching elements, but the practicality of transistors depends on values of voltage and current ratings dictated by the final system design. Much of the logic and signal manipulation of either power conditioning link will lend itself to digital processing and microprocessor control giving a finished product in which a large percentage of the signal level electronics is integrated circuits.

IV. DC Link Inverter with Reversing Differential

A. System Description.

Figure 4:
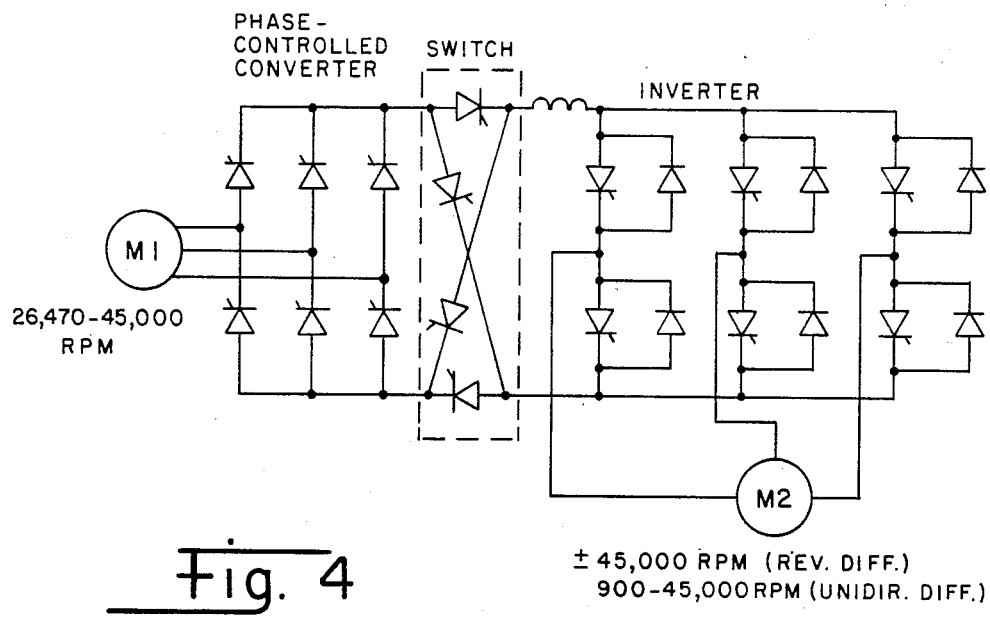
FIG. 4 is a schematic diagram showing the power components of a DC link drive system.

Power level components of a dc link drive system for use with the reversing differential are shown in FIG. 4 where motor M2 is operated as a brushless dc machine while alternator M1 functions as a variable speed synchronous machine.

In order to simplify the analysis, the phase-controlled converter and alternator M1 of FIG. 4 are modelled as a dc source which, when coupled to the inverter and motor M2, forms a nonplanar network. In this resulting network, the various SCRs (or transistors) and diodes are represented by nonlinear resistors the resistance of which are assigned small values when forward conducting and large values when reverse biased. For a wye-connected motor M2, the constraint that the phase currents must add to zero exists; thus, a system of two first-order differential equations is sufficient to describe the network. These equations have nonlinear coefficients due to the values of SCR (or transistor) and diode resistance being functions of the dependent variable (phase currents). Further, each 60° (electrical), a switching operation transpires in the inverter circuitry requiring a revised set of differential equations to describe the system; therefore, the differential equation coefficients are also functions of the position ($\theta_2$) and speed ($\omega_2$) of motor M2 rotor. In matrix notation, the network equations can be written as $$pi = [A(i,\theta_2)]i + [B(\omega_2)]u \qquad (3)$$

where i is a vector of two independent phase currents ($i_1$, $i_2$), and u is a vector the entries of which are phase generated voltages and the dc source which models the phase-controlled converter and alternator M1 combination.

B. Control Approach.

Figure 5:
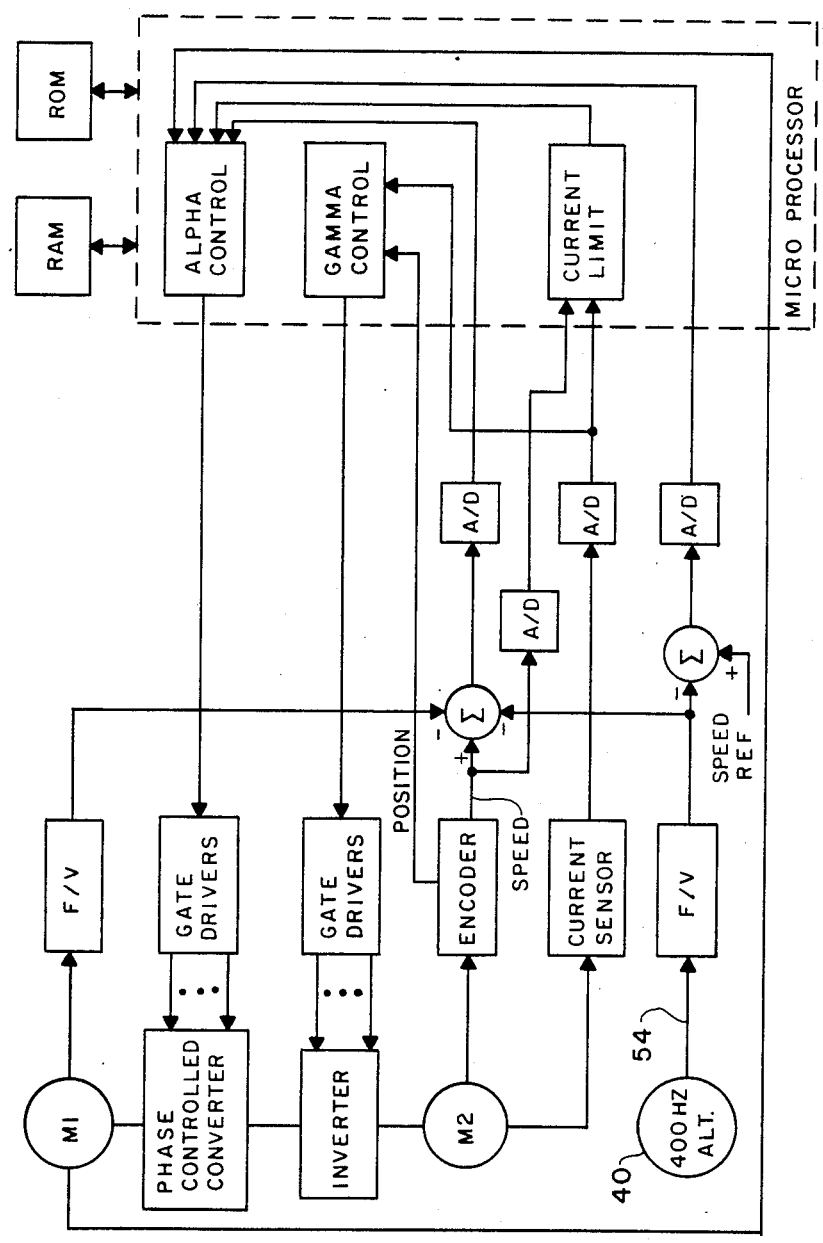
FIG. 5 is a block diagram of a DC link drive system.

A block diagram of a control approach for unit 50 that can be applied to this dc link drive system is displayed in FIG. 5. A primary control loop is established with a speed reference signal via line 54 to assure that the 400 Hz alternator 40 maintains rated speed. A secondary control loop is present to guarantee that equation (2) is satisfied. The SCRs (or transistors) of the inverter are fired in a manner to maintain a constant commutation angle $\gamma$, related to the angle between the mmf wave of the rotor and the no-load mmf wave of the stator. The delay angle of the phase-controlled converter is varied to regulate the value of dc link voltage applied to the inverter terminals. Steady-state characteristics of this drive are quite similar to those of a dc machine system (references 1, 10) except for the extra degree of freedom that exists in selecting $\gamma$.

The block diagram of FIG. 5 (unit 50), is shown with a microprocessor based control on current limit and SCR firing. It is likely that summing functions of the primary and secondary speed loops can also be handled as microprocessor operations if timing and sample rates do not become limiting factors.

E. Performance Results.

Values were selected for motor and choke coil parameters as $R_a = 0.006\Omega$, $L_a = 25 \times 10^{-6}$H, $R_o = 0.003\Omega$, and $L_o = 43 \times 10^{-6}$H. A numerical solution of the equations represented by (3) was implemented using a fixed increment, fourth-order Runge-Kutta procedure to find performance of the dc link drive for various values of constant speed. A trial-and-error search was made for the average values of motor M2 shaft torque ($T_{sav}$) to satisfy the requirements established by FIG. 2. Results of points calculated across the speed range for forward flow of compensating loop power and partial range values for reverse flow of compensating loop power are shown in Table I.

TABLE I

| PERFORMANCE OF DC LINK WITH REVERSING DIFFERENTIAL | | | | | |
|---|---|---|---|---|---|
| Speed (rpm) | $T_{sav}$ (N-m) | $\alpha$ (degrees) | $\gamma$ (degrees) | $I_{ave}$ (A) | $I_{rms}$ (A) |
| 45,000 | 2.46 | 18.2 | 45 | 56.4 | 69.5 |
| 22,000 | 2.48 | 61.6 | 45 | 56.2 | 69.2 |
| 5,000 | 2.51 | 82.8 | 45 | 56.4 | 69.8 |
| 500 | 2.24 | 88.2 | 45 | 55.2 | 66.3 |
| 50 | 2.53 | 88.5 | 45 | | |
| −500 | −2.45 | 89.3 | 165 | 47.0 | 56.8 |
| −5,000 | −2.36 | 91.3 | 150 | 81.9 | 92.9 |
| −10,000 | −2.46 | 90.3 | 140 | 115.2 | 130.6 |

It can be observed that the values of average and RMS current required to produce the needed torque when motor M2 is in the regeneration mode (reverse flow of compensating power) increase as speed becomes more negative. This increase in current values is attributable to a marked increase in the magnitude and time that current flows through the inverter shunting diodes. At some point for speed more negative than −22,000 rpm, the shunting diode current reaches a conduction angle equal to 60° at which point commutation failure occurs. A full range regenerative range operation with motor M2 acting as a brushless dc machine is not possible. At some negative value of speed, it would be necessary to change modes of operation; motor M2 would be allowed to operate as a variable frequency synchronous generator with the inverter shunting diodes acting as a three-phase, full-wave bridge rectifier and the phase-controlled converter could be controlled for synchronous inversion. However, use of a bridge switch as shown in FIG. 4 would be necessary to establish proper polarity of dc voltage to the phase-controlled converter for synchronous inversion. Calculations show that the average values of current can be reduced to acceptable levels with the synchronous inversion operation; however, the mode change creates control complexities. Further, with addition of the bridge switch, the number (16) of power level switching devices has closely approached the quantity (18) necessary for the cycloconverter link which is capable of full speed range regenerative operation without a control mode change.

Cycloconverter Link with Reversing Differential

A. System Description.

Figure 6:
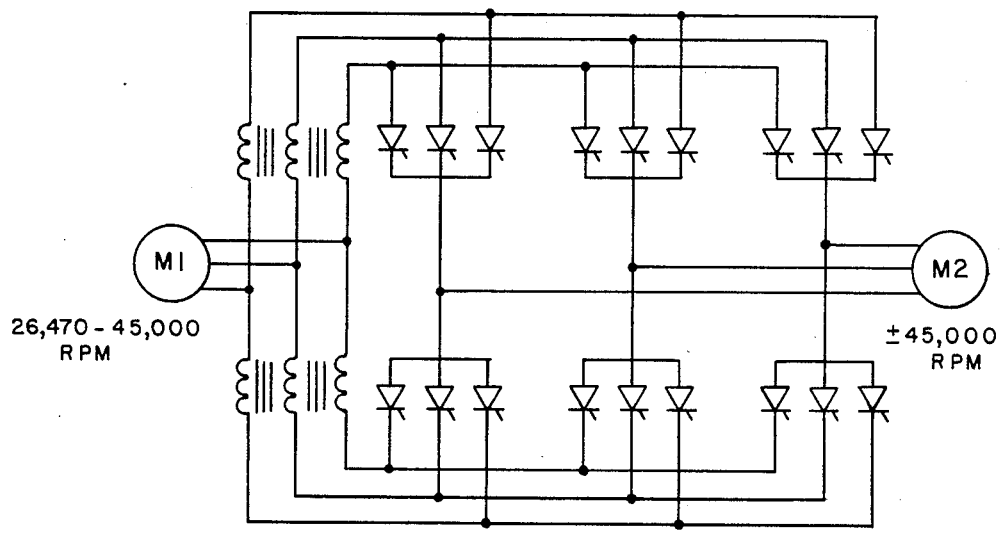
FIG. 6 is a schematic diagram of the power components of a cycloconverter link drive.

Power level components of a cycloconverter drive system for use with the reversing differential are shown in FIG. 6. As in the dc link case previously discussed, motor M2 operates as a brushless dc machine while alternator M1 functions as a variable speed synchronous machine.

It is permissible to model alternator M1 as seen from the terminals of motor M2 as a dc source that is magnitude dependent on both the speed of alternator M1 and an SCR firing delay angle $\alpha$. However, since the response of motor M2 due to the frequency of alterntor M1 is desired it is necessary to describe $V_d$, the instantaneous waveform of alternator M1 generated voltage as seen from the terminals of motor M2, in 60° increments of the alternator M1 voltage waveform giving the expression $$V_d = V_m \sin(\omega_1 t - \phi + \pi/3 + \alpha) \tag{4}$$

where $V_m$ depends on the speed of alternator M1, $\omega_1$, is the electrical angular frequency of alternator M1 and $\phi$ is a phase shift angle that depends upon the particular 60° increment of the motor M1 waveform that is applicable at the instant of solution. The nonplanar network that results when $V_d$ is coupled to motor M2 through the cycloconverter is described by a set of two differential equations with nonlinear coefficients as discussed in section IV except that now the forcing function coefficient matrix has entries that depend on the electrical angular frequency of motor M1:

$$pi = [A(i, \theta_2)]i + [B(\omega_1, \omega_2)]u \tag{5}$$

B. Control Approach.

Figure 7:
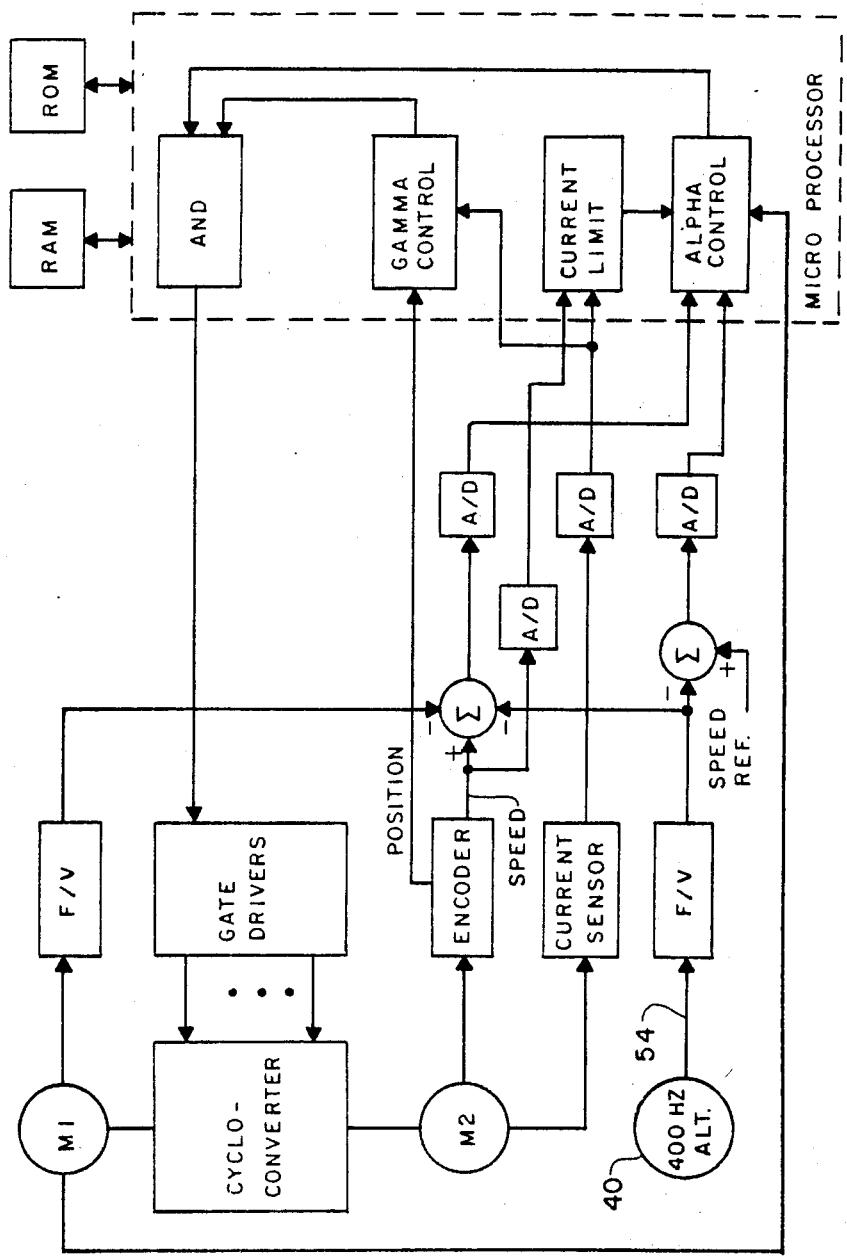
FIG. 7 is a block diagram of a cycloconverter drive system.

A control approach is suggested by the block diagram of FIG. 7. The philosophy is basically that of the dc link system given by FIG. 5 (discussed in Section IV) except that gating of the SCRs must be handled in such a manner to assure that both the commutation angle $\gamma$ and delay angle $\alpha$ are both simultaneously satisfied.

C. Performance Results.

The PM machine constants were unchanged from the dc link study. Values for the choke coil parameters were selected as $R_0 = 0.003\Omega$ and $L_0 = 150 \times 10^{-6}$ H. A numerical solution of the equations represented by (5) was implemented and a trial-and-error search made for average values of motor M2 shaft torque ($T_{sav}$) to satisfy the requirements established in FIG. 2.

Performance points across the speed range for forward and reverse flow of compensating power are tabulated in Table II. It is observed that control across the region of reverse compensating power flow is nicely accomplished by shift of delay angle $\alpha$ greater than 90° and an additional forward shift of $\gamma$ by 120°. No increase in motor M2 phase current occurs as in the case of dc link when

TABLE II

PERFORMANCE OF CYCLOCONVERTER LINK WITH REVERSING DIFFERENTIAL

| Speed (rpm) | $T_{sav}$ (N-m) | $\alpha$ (degrees) | $\gamma$ (degrees) | $I_{ave}$ (A) | $I_{rms}$ (A) |
|---|---|---|---|---|---|
| 45,000 | 2.59 | 33.0 | 45 | 55.6 | 66.9 |
| 22,000 | 2.48 | 68.6 | 45 | 54.3 | 65.6 |
| 5,000 | 2.53 | 84.7 | 45 | 58.2 | 62.6 |
| 500 | 2.48 | 88.8 | 45 | 53.7 | 58.8 |
| 50 | 2.49 | 89.1 | 45 | | |
| 0 | 2.49 | 89.1 | 45 | | |
| −5,000 | −2.45 | 92.6 | 165 | 47.4 | 58.0 |
| −22,000 | −2.45 | 103.2 | 165 | 50.7 | 58.8 |
| −45,000 | −2.53 | 116.1 | 166 | 48.0 | 58.2 |
| 45,000 | 3.76 | 0 | 47 | 73.7 | 87.1 |

The last entry of Table II presents a set of control conditions and results for meeting a 150% load case (short time overload). Operation at such a point is automatically permitted by the control system unless prohibited by limits. Since current is monitored, the microprocessor can allow a timed interval of operation at any point above rated value before initiation of a limit action creating quite a flexible approach to overload management.

Figure 8A:
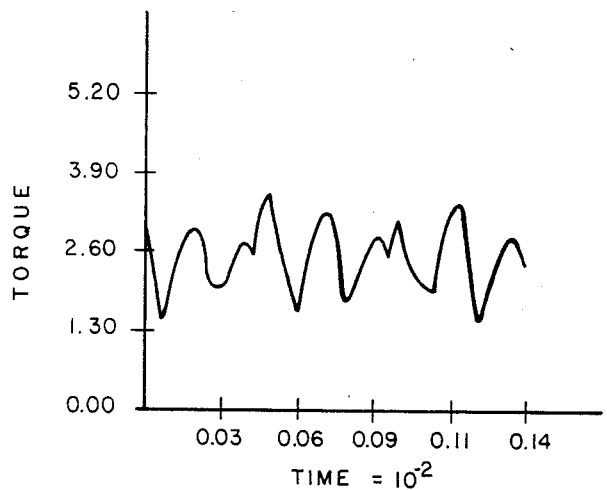
FIGS. 8A and 8B are graphs showing the calculated torque for a cycloconverter link with a reversing differential, respectively for (a) forward compensating power flow (+22,000 RPM) and (b) reverse compensating power flow (−22,000 RPM).
Figure 8B:
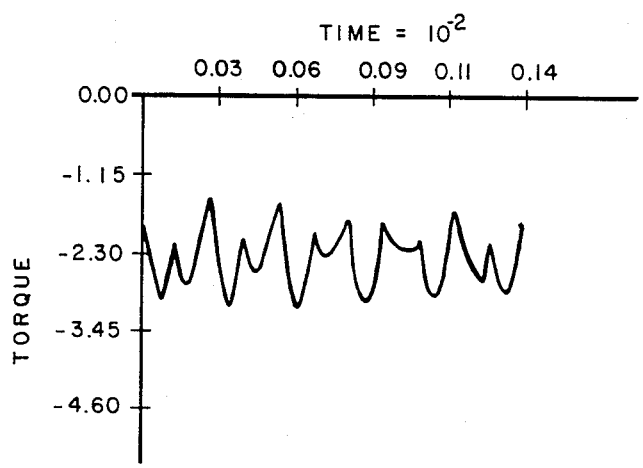

FIGS. 8A and 8B display the steady-state instantaneous motor M2 torque at a forward and a reverse compensating power flow point. There is inherently a pulsating torque component present in the brushless dc motor operation of a frequency that is six times the electrical angular frequency of motor M2. At low speeds, this pulsation frequency can decrease to within a range at which the mechanical components respond. The control system will have a feature to assure that at low mechanical speeds, the gate drives are cyclically enabled and disabled at a frequency above that at which mechanical response is possible.

VI. DC Link Inverter with Unidirectional Differential

A. System Description and Control.

Power level component arrangement of a dc link drive system for use with a unidirectional differential is the same as shown in FIG. 4 except that the bridge switch is not needed. The system equations are formulated as discussed in section IV and are given by (3). The block diagram of FIG. 5 is applicable in describing a control system 50 for this unidirectional differential drive.

B. Performance Result.

The drive system must meet the performance criteria of FIG. 3. Since the torques required are approximately 50% greater than for the reversing differential case, the PM machines will necessarily be about 50% larger in size. The parameters for motor M2 and the choke coil values are adjusted accordingly to give $R_a = 0.004\Omega$, $L_a = 15 \times 10^{-6}$ H, $R_0 = 0.003\Omega$, and $L_0 = 25 \times 10^{-6}$ H. A numerical solution for values of average torque to satisfy the requirements of FIG. 3 and the results are presented in Table III.

TABLE III

PERFORMANCE OF DC LINK WITH UNIDIRECTIONAL DIFFERENTIAL

| Speed (rpm) | $T_{sav}$ (N-m) | $\alpha$ (degrees) | $\gamma$ (degrees) | $I_{ave}$ (A) | $I_{rms}$ (A) |
|---|---|---|---|---|---|
| 45,000 | 4.09 | 22.7 | 45 | 92.7 | 114.2 |
| 22,000 | 3.98 | 62.5 | 45 | 89.6 | 110.7 |
| 5,000 | 3.98 | 82.6 | 45 | 91.0 | 111.5 |
| 900 | 4.12 | 86.9 | 45 | 100.6 | 120.9 |

Inspection of Table III shows that average current values are approximately 60% greater than for the reversing differential case (See Table I). Although this unidirectionally operated differential offers control simplification in that only one direction of compensating power flow is required and the necessity of dealing with torque pulsations at near zero speed is eliminated, the increased size requirements on the PM machines (to deliver approximately 50% more torque) and the increased current ratings on the SCRs or transistors (to conduct approximately 60% more current) are considered to be significant weight and cost penalties.

The invention is described in a paper "Electrically Compensated Aircraft Alternator Drive" by J. J. Cathey, published in the Proceedings of the IEEE 1983 National Aerospace and Electronics Conference—NAECON 1983—Held May 17-19, 1983. The paper reports on a study directed by applicant, and is hereby incorporated by reference.

It is understood that certain modifications to the invention as described may be made, as might occur to one with skill in the field of this invention, within the scope of the appended claims. Therefore, all embodiments contemplated hereunder which achieve the objects of the present invention have not been shown in complete detail. Other embodiments may be developed without departing from the spirit of the invention or from the scope of the appended claims.

I claim:

1. Apparatus comprising
a differential which mechanically sums the speeds of first and second input shafts and outputs this sum to an output shaft, for driving the output shaft at a desired speed, with the first input shaft mechanically coupled to a power source;
speed compensating means comprising a first electrical machine mechanically coupled to be driven by said power source, a second electrical machine mechanically coupled to said second input shaft, and an electrical power conditioning network electrically coupled between the first electrical machine and the second electrical machine, a speed reference lead connected between a device coupled to the output shaft and the power conditioning network to provide an electrical signal which is a function of the speed of the output shaft, the power conditioning network being operative responsive to said electrical signal to transfer electric power between the first electrical machine and the second electrical machine for driving the second input shaft at a speed which compensates for the difference in speed between the first input shaft and the desired speed of the output shaft;
wherein said first and second electrical machines are each a high-speed, permanent-magnet, brushless, three-phase, variable speed machine having three electrical terminals; wherein the transfer of power between the first and second electrical machines is bidirectional with either operating as a generator while the other is operating as a direct-current motor, depending on the speed of the first input shaft;
wherein said electrical power conditioning network comprises a plurality of switching elements connected in a three-phase to three-phase arrangement between the three electrical terminals of the first electrical machine and the three electrical terminals of the second electrical machine, each switching element having a control electrode for turning it on or off, and control means having output drivers coupled to the control electrodes;
wherein the control means comprises a primary control loop having said speed reference lead connected as an input, and a secondary control loop, means for sensing position, speed, and currents for the second electrical machine and for supplying signals which are functions thereof for use in the secondary control loop, both the primary and secondary control loops having A/D converter means, and digital processor means having as inputs digital signals from the A/D converter means and outputs to the output drivers.

2. Apparatus according to claim 1, wherein the power conditioning network is a direct-current link drive in which said switching elements are operated as a phase-controlled converter followed by an inverter, with different switching elements providing the phase-controlled converter function and the inverter function, depending upon the direction of power flow between the first and second electrical machines.

3. Apparatus according to claim 1, wherein the power conditioning network is a cycloconverter link drive.

* * * * *

UNITED STATES PATENT AND TRADEMARK OFFICE
CERTIFICATE OF CORRECTION

PATENT NO. : 4,572,961

DATED : February 25, 1986

INVENTOR(S) : William U. Borger

It is certified that error appears in the above-identified patent and that said Letters Patent is hereby corrected as shown below:

Column 1, line 39, "nost" should read --most--.

Column 2, line 61, "FIGS. 1A" should read --FIGS. 1B--.

Column 5, line 32, "1800 rpm)" should read --18,000 rpm)--.

Column 6, line 36, "2, 3, 9)" should read --2, 8, 9)--.

Column 6, line 46, "raction" should read --reaction--.

Column 9, line 16, "alterntor" should read --alternator--.

Column 9, line 61, the text --motor M2 is regeneratively operated.-- should follow "when".

Signed and Sealed this

Twelfth Day of August 1986

[SEAL]

Attest:

DONALD J. QUIGG

Attesting Officer

Commissioner of Patents and Trademarks